United States Patent
Bhattacharya et al.

(10) Patent No.: US 12,093,287 B1
(45) Date of Patent: Sep. 17, 2024

(54) METHOD AND SYSTEM USING VALUE-BASED IDENTIFICATION FOR UNLABELED TRANSACTION

(71) Applicant: Coupa Software Incorporated, San Mateo, CA (US)

(72) Inventors: Arindam Bhattacharya, Chicago, IL (US); Ankit Narang, Pune (IN)

(73) Assignee: Coupa Software Incorporated, San Mateo, CA (US)

(*) Notice: Subject to any disclaimer, the term of this patent is extended or adjusted under 35 U.S.C. 154(b) by 0 days.

(21) Appl. No.: 18/175,188

(22) Filed: Feb. 27, 2023

(51) Int. Cl.
G06F 16/00 (2019.01)
G06F 16/2457 (2019.01)
G06F 16/28 (2019.01)

(52) U.S. Cl.
CPC ...... *G06F 16/285* (2019.01); *G06F 16/24578* (2019.01)

(58) Field of Classification Search
None
See application file for complete search history.

(56) References Cited

U.S. PATENT DOCUMENTS

| | | | |
|---|---|---|---|
| 9,965,719 B2 | 5/2018 | Choi et al. | |
| 11,429,889 B2* | 8/2022 | Dorner | G06F 16/2462 |
| 11,663,661 B2* | 5/2023 | Hari Haran | G06F 16/285 |
| | | | 706/12 |
| 2017/0124415 A1 | 5/2017 | Choi et al. | |
| 2018/0032901 A1* | 2/2018 | Chowdhury | G06F 40/169 |
| 2018/0330270 A1* | 11/2018 | Dorner | G06F 16/2462 |
| 2019/0258722 A1* | 8/2019 | Guo | G06F 16/9024 |
| 2019/0391982 A1* | 12/2019 | Duzhik | G06F 16/953 |

(Continued)

FOREIGN PATENT DOCUMENTS

JP 6547069 6/2019

OTHER PUBLICATIONS

Jpmorgan, "Learning More From Less Data With Active Learning", Oct. 10, 2019, <https://www.jpmorgan.com/insights/technology/active-learning>, 3 pages.

(Continued)

*Primary Examiner* — Farhan M Syed
(74) *Attorney, Agent, or Firm* — Baker Botts L.L.P.

(57) ABSTRACT

In one embodiment, a method includes assessing unlabeled transaction data and unlabeled candidate transaction data. The method includes determining a first plurality of features for the unlabeled transaction data and a second plurality of features for the unlabeled candidate transaction data using a Bag of Words model. The method includes determining matching pairs using the unlabeled transaction data and the unlabeled candidate transaction data. The method includes calculating similarity scores for the matching pairs using the first plurality of features and the second plurality of features. The method includes generating a machine learning model to predict a subcategory label and a ranking value for the unlabeled candidate transaction data using the similarity scores of the matching pairs. The method includes determining, using the machine learning model, the subcategory label and the ranking value associated with the unlabeled candidate transaction data.

13 Claims, 9 Drawing Sheets

(56) References Cited

U.S. PATENT DOCUMENTS

2022/0375193 A1 11/2022 Najibikohnehshahri et al.
2023/0259112 A1* 8/2023 Cheon ................ G05B 19/4184

OTHER PUBLICATIONS

G. Zheng et al., "Opentag: Open Attribute Value Extraction From Product Profiles", arXiv:1806.01264v2 [cs.CL] Oct. 6, 2018, Association for Computing Machinery, 10 pages.
A. Shahraki et al., "Active Learning for Network Traffic Classification: a Technical Survey". IEEE Transactions on Cognitive Communications and Networking, arXiv:2106.06933v1 [cs.NI] Jun. 13, 2021, 19 pages.
Wikimedia Foundation, Inc., "Latent Dirichlet Allocation", <https://en.wikipedia.org/wiki/Latent_Dirichlet_allocation>, retrieved May 15, 2023, 8 pages.

* cited by examiner

METHOD AND SYSTEM USING VALUE-BASED IDENTIFICATION FOR UNLABELED TRANSACTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022-2023 Coupa Software Incorporated.

TECHNICAL FIELD

One technical field of the present disclosure is computer-implemented methods of subcategory-level transaction classification in transaction processing systems, such as real-time, online transaction processing systems. Another technical field is software-implemented prioritization and labeling of unlabeled candidate transaction data in systems that use artificial intelligence or machine learning.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Vendors have made extensive efforts to develop effective predictive models using unlabeled transaction data to streamline the steps of a procurement process. However, because of the very large size of unlabeled transaction data, such as hundreds of millions of unlabeled transactions, it is time-consuming and labor-intensive to manually label all our unlabeled transaction data. Accurate subcategory-level transaction classification is a long-standing effort within the artificial intelligence (AI) center of excellence (COE). A text classification model is used to predict labels at such a high level of granularity based on a substantial amount of unlabeled data. Specifically, data scientists seek to develop a label identification algorithm to provide targeted, data-driven recommendations for unlabeled transactions to prioritize manual labeling. Further, the label classification algorithm can be applied to label the unlabeled transactions which have the largest positive impact on the performance of the predictive models.

SUMMARY

The appended claims may serve as a summary of the invention.

DETAILED DESCRIPTION

Figure 1:
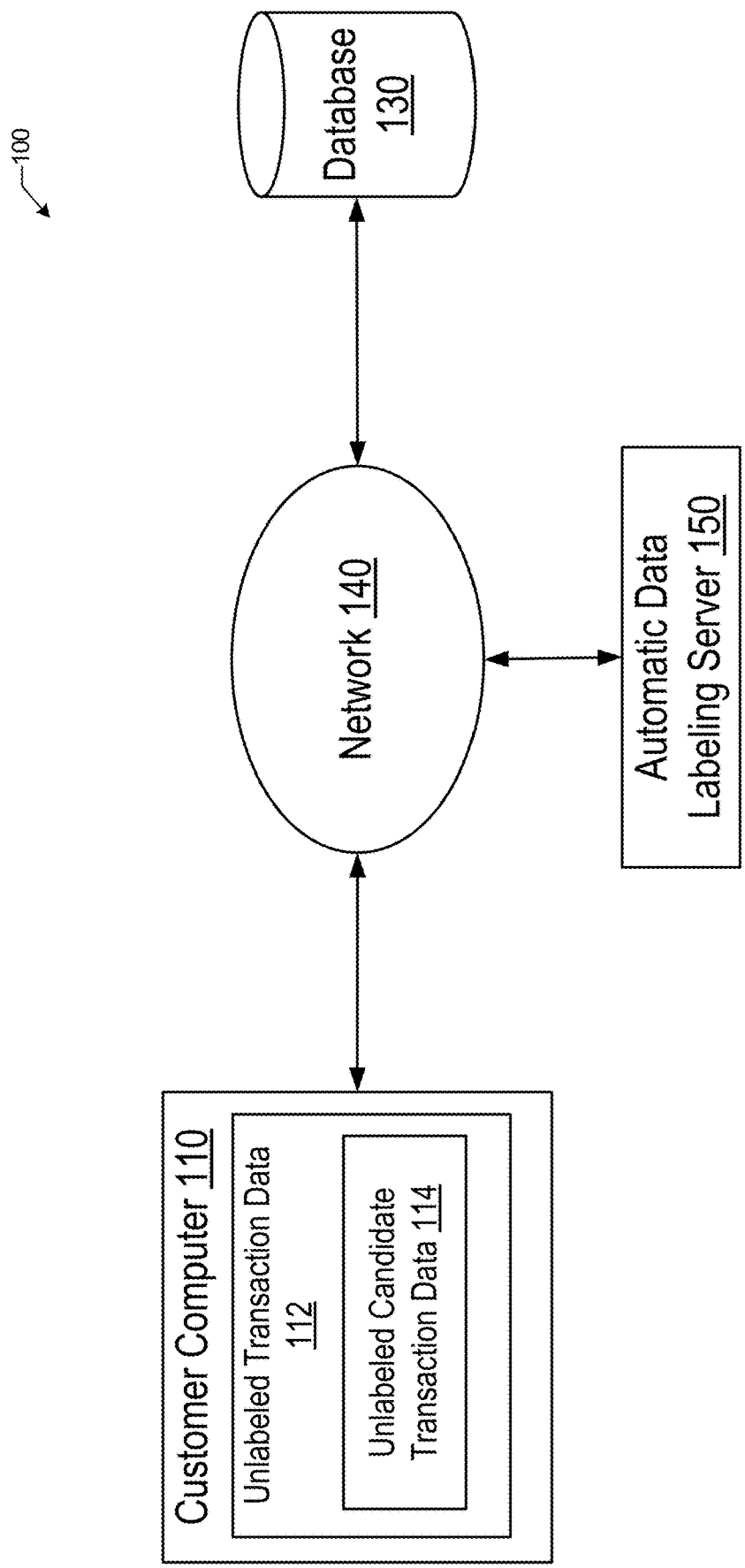
FIG. 1 shows a label identification system using an automatic data labeling server in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis of interpreting the claims. Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to more fully illustrate one or more aspects of the inventions. Similarly, although process steps, method steps, algorithms or the like may be described in a sequential order, such processes, methods and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of the more than one device or article.

The functionality or the features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

Embodiments are described in sections below according to the following outline:
1. GENERAL OVERVIEW
2. STRUCTURAL AND FUNCTIONAL OVERVIEW
    2.1 DISTRIBUTED COMPUTER SYSTEM EXAMPLE
    2.2 FUNCTIONAL OVERVIEW
3. PROCEDURAL OVERVIEW
4. IMPLEMENTATION EXAMPLE
5. HARDWARE OVERVIEW 1. General Overview In an embodiment, a computer-implemented method can be programmed for value-based automatic label identification using a machine learning model for unlabeled transaction data.

Procurement applications apply various machine learning models to enhance the effectiveness and safety of the financial and administrative processes within an organization of interest. Many input datasets to machine learning models, such as invoice transaction data, initially consist of unlabeled records which need to be manually labeled before supervised learning models can be trained. For example, the transaction data may include one or more line-level text descriptions of items, such as dates, long strings of numbers, common text delimiters, tokens consisting of only punctuation, common tokens and/or phrases, etc. As another example, the transaction data may include one or more structured data fields and/or one or more unstructured data fields, including entity-defined categories, transaction amount, transaction location, transaction description, transaction date, merchant identifier, and/or other structured or unstructured fields provided by an interface for submitting procurement requests and/or expenses for reimbursement. When unlabeled transaction data is sufficiently large-scale (e.g., hundreds of millions of invoices), it becomes infeasible to manually label all the transaction data. Furthermore, since manual data labeling is very time-consuming and labor-intensive, it is imperative that any efforts aimed at manually labeling a subset of transaction data, such as unlabeled candidate transaction data, be as targeted and efficient as possible.

One technical benefit of an embodiment is to improve the data processing efficiency of a workflow for large datasets for subcategory-level transaction classification and prioritization of unlabeled transaction data; when the most valuable transaction data (from a predictive modeling standpoint) is prioritized for labeling, then far fewer resources are required to achieve the same degree of model and subcategory prediction improvement. For example, the computer-implemented method can apply a heuristics-based algorithm to rank all descriptions in the unlabeled transaction data to determine a high-value subset of the transaction data which includes invoice data of various subcategories, such as "commodity", "food", "loans", "entertainment", "music", "travel", and "transportation", etc. Descriptions within such a subset are referred to as "candidates" henceforth.

In an embodiment, a method can determine a plurality of features for the subset of unlabeled transaction data and a plurality of features for the unlabeled candidate transaction data using a Bag of Words model. The computer-implemented method can determine a plurality of matching pairs using the unlabeled candidate transaction data and the unlabeled transaction data. The computer-implemented method can calculate a plurality of similarity scores for the plurality of matching pairs using the first plurality of features and the second plurality of features. The computer-implemented method can calculate a ranking value associated with the unlabeled candidate transaction data and generate a machine learning model to predict a subcategory label using the similarity scores for the plurality of matching pairs. The subcategory label and the ranking value can provide targeted and data-driven recommendations for subcategory classification for unlabeled candidate transactions as in an end-to-end solution for commodity classification to drive efficiency and accurate results at every step of the solution process, such as ranking, manual labeling, and prediction.

One technical benefit of an embodiment is to improve the data processing efficiency of a workflow for large datasets by ranking values associated with unlabeled candidate transaction data to be labeled. As an example and not by way of limitation, an embodiment may use heuristics to identify a subset of unlabeled transaction data that are good candidates for labeling, such as identifying the frequency of exact descriptions of matches and/or duplicates (e.g., labeling at least a correct label for instances of matches and/or duplicates). As an example and not by way of limitation, an embodiment may identify a description having an exact match across several instances, and ranking the subset of the unlabeled data higher as it may impact several customers. As an example and not by way of limitation, an embodiment may identify descriptions that are commonplace but are too short and/or vague to be worth classifying. As an example and not by way of limitation, an embodiment may identify higher spend items that should generally be more valuable to label and classify.

Another key technical benefit of an embodiment is a meaningful estimate of the marginal benefit of labeling a new, previously unlabeled candidate transaction. By implementing a nearest-neighbor predictive model, using the same underlying mathematical foundation (Jaccard similarity) for both the ranking algorithm and the nearest-neighbor predictive model, and defining a clear criteria for "high-confidence predictions", an embodiment can quantify the number of new high-quality predictions that will result from each newly labeled candidate. Quantifying the predictive value of newly labeled data is a common area of difficulty in active learning, and this approach facilitates answering key questions, such as "How quickly will our overall prediction accuracy improve over time?" and "When do the resources required for further labeling exceed the benefits of said labeling (i.e., when is additional labeling no longer worth it?)"

2. Structural and Functional Overview 2.1 Distributed Computer System Example

FIG. 1 illustrates a distributed computer system showing the context of use and principal functional elements with which one embodiment could be implemented. In an embodiment, a label identification system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of labeling prioritization and prediction for subcategory classification in order to provide additional labeled transaction data for improving accuracy and effectiveness of predictive models in a procurement process. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1 shows a label identification system using an automatic data labeling server in accordance with one or more embodiments. The label identification system may be used to implement disclosed embodiments, including exemplary system components. The components and arrangement, however, may be varied. While FIG. 1 shows various configurations of components, other configurations may be used without departing from the scope of the disclosure. For example, various components in FIG. 1 may be combined to create a single component. As another example, the functionality performed by a single component may be performed by two or more components.

In the example of FIG. 1, the label identification system 100 is configured for predicting a subcategory label and a ranking value for unlabeled candidate transaction data 114 for a customer. For example, the unlabeled candidate transaction data 114 can be determined from a subset of a full set of unlabeled transaction data 112 using initial heuristics-based ranking algorithm. The label identification system 100 may include a customer computer 110 associated with the customer, an automatic data labeling server 150, a database 130, and a network 140. The automatic data labeling server 150 may be implemented in various embodiments using a specially programmed desktop computer, a server, a mainframe computer, or any combination of these components.

The customer computer 110 can access the automatic data labeling server 150 through the network 140, which broadly represents any wireline or wireless network, using any of satellite or terrestrial network links, such as local area networks (LANs), metropolitan area networks (MANs), wide area networks (WANs), campus network, internetworks, or combinations thereof. The network 140 may include or comprise the public internet and networked server computers that implement Web2 and/or Web3 technologies. The network 140 may comprise or support intranets, extranets, or virtual private networks (VPNs). The label identification system 100 may be standalone or it may be part of a subsystem, which may, in turn, be part of a larger system, such as a legacy procurement system.

In some embodiments, the customer computer 110 broadly represents one or more computers, virtual computing instances, and/or instances of an e-procurement application program that are associated with an institution or entity. The term "customer" is used herein for convenience, and can apply to an embodiment in which an entity or user associated with the computer 110 has a customer-service provider relationship with a different entity that owns, manages, or controls the automatic data labeling server 150; other embodiments do not require such a relationship and the label "customer" is not required for element 110 in all embodiments. In an embodiment, customer computer 110 is programmed to create a customer account with the automatic data labeling server 150 and manage digital documents related to a customer account during procurement transactions, such as receiving unlabeled transaction data 112 and unlabeled candidate transaction data 114 from the customer computer 110. For example, the unlabeled transaction data 112 can include hundreds of millions of invoices with various categories, such as "commodity", "food", "loans", "entertainment", "music", "travel", and "transportation", etc. Further, each category may have one or more subcategories. For example, subcategories of "beverages", "alcoholic beverages", "snack", etc. may exist for the category of "food". The unlabeled candidate transaction data 114 can include one or more invoices for labeling. In particular, the unlabeled candidate transaction data 114 can also include the same invoice data as the unlabeled transaction data 112. The customer computer 110 may send the unlabeled transaction data 112 and the unlabeled candidate transaction data 114 to the automatic data labeling server 150 to generate a machine learning model for label prioritization and prediction. Likewise, the customer computer 110 may store the unlabeled transaction data 112 and the unlabeled candidate transaction data 114 in a database 130, which can be organized as a relational database system responsive to a structured query language (SQL) or using a no-SQL architecture, object database, or flat file system.

The customer computer 110 may comprise a desktop computer, laptop computer, tablet computer, smartphone, wearable device, or any other type of computing device that is capable of proper communication with the automatic data forecasting server 150 as well as adequate local data processing and storage. In some cases, a customer computer 110 may be a personal computer or workstation that hosts or executes a browser and communicates via HTTP and HTML, over the network 140 with a server-side e-procurement application hosted or executed at the automatic data labeling server 150. In other cases, a customer computer 110 may be a server-class computer and/or virtual computing instance that hosts or executes an instance of an e-procurement application that communicates programmatically via API calls, RPC or other programmatic messaging with the automatic data labeling server 150.

The customer computer 110 can enable intelligent online navigation of product information based on data related to past online activities regarding the products, such as selections, requisitions, purchases, invoices, or payments. For example, a requisition is a request for goods and services made by a customer to a purchase department in a company. The requisition forms the basis of a purchase order which is a commercial document which confirms an order and authorizes the purchase transaction for goods or services from a supplier. As another example, a purchase order includes information regarding date, prices, delivery, different agreed terms and conditions, such as discounts, a purchase order number, and the timeframe for payment. The customer via the customer computer 120 can collect transaction data, such as an invoice, a purchase order, or a requisition form, for manual labeling based on the unlabeled transaction data 112. As a result, the automatic data labeling server 150 can enable intelligent subcategory labeling for unlabeled candidate transaction data 114 which is selected from a subset of the unlabeled transaction data 112 to enhance procurement experience for specific groups of users or procurement targets for the customer.

In some embodiments, the automatic data labeling server 150 broadly represents one or more computers, such as a server farm, a cloud computing platform, or a parallel computer, virtual computing instances, and/or instances of a server-based application. The data labeling server 150 is programmed or configured to host or execute functions including but not limited to managing customer accounts associated with the one or more customer computers 110, and facilitating generation and maintenance of digital documents during subcategory labeling for unlabeled candidate transaction data 114 received from customer accounts, such as catalogs, purchase requisitions, purchase orders, invoices, and payments. The automatic data labeling server 150 is also programmed or configured to host or execute functions including but not limited to providing real-time automatic data labeling for electronic procurements.

2.2 Functional Over View

Figure 2:
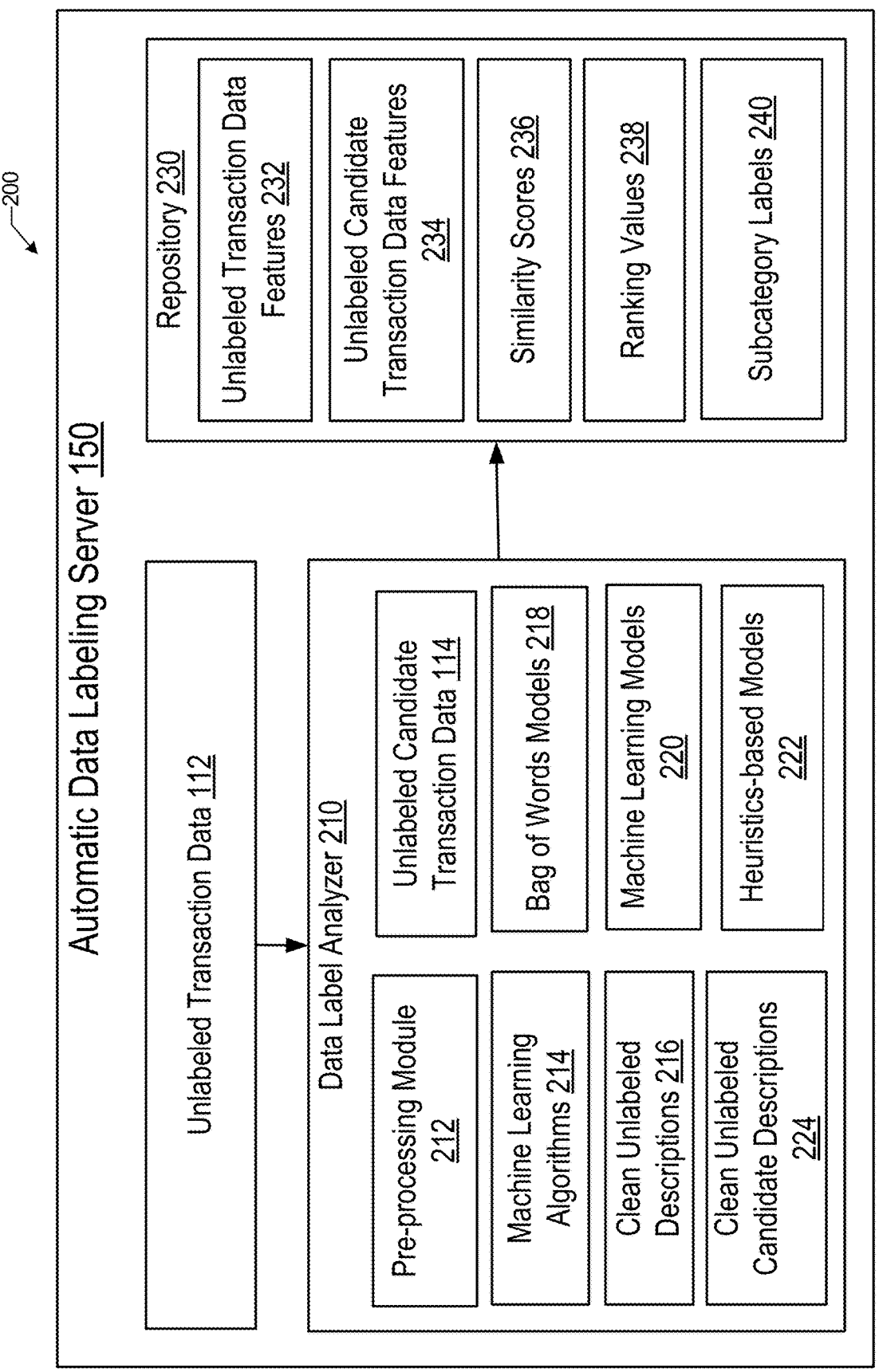
FIG. 2 shows an example of an automatic data labeling server in accordance with one or more embodiments.

FIG. 2 shows an example of an automatic data labeling server in accordance with one or more embodiments. The automatic data labeling server 150 may be used to implement disclosed embodiments, including exemplary system components. The components and arrangement, however, may be varied. While FIG. 2 shows various configurations of components, other configurations may be used without departing from the scope of the disclosure. For example, various components in FIG. 2 may be combined to create a single component. As another example, the functionality performed by a single component may be performed by two or more components. Elements labeled "data," "descriptions," "features," "scores," "values," and "labels" in FIG. 2 refer to digitally stored data in electronic digital memory, such as the main memory of the server 150. Elements labeled "module" or "algorithms" in FIG. 2 refer to one or more sequences of stored program instructions that have been organized and programmed according to the functions, processes, routines, and algorithms that this section describes. Elements labeled "models" comprise one or more machine learning models and associated configuration data and/or library functions.

In the example of FIG. 2, the automatic data labeling server 150 is programmed or configured to execute automatic label prioritization and prediction for unlabeled candidate transaction data 114, which is selected from a subset of the unlabeled transaction data 112 using a heuristics-based model 222. In an embodiment, the automatic data labeling server 150 may include a data label analyzer 210 to apply a machine learning model 220 to determine a subcategory label 240 and a ranking value 238 for unlabeled candidate transaction data 114 based on unlabeled transaction data 112. The data label analyzer 210 can include a pre-processing module 212 that is programmed to apply a pre-processing workflow to determine clean unlabeled descriptions 216 and clean unlabeled candidate descriptions 224 which include useful line-level text description of items from the unlabeled transaction data 112 and the unlabeled candidate transaction data 114, respectively. For example, the clean unlabeled descriptions 216 include M descriptions in a large quantity, such as up to 10 million descriptions, and the clean unlabeled candidate descriptions 224 include N descriptions also in a small quantity, such as up to 20 thousand descriptions.

The pre-processing module 212 can be programmed to apply the pre-processing workflow in three phases. In the first phase, the pre-processing module 212 can perform extensive regex-based item description cleaning to extract item descriptions by removing common tokens that have no bearing on the item being purchased. For example, the common tokens include dates, long strings of numbers, common text delimiters, tokens consisting of only punctuation, and common tokens and/or phrases, etc. The dates can be described as a numbered day in a numbered month and the year, a numbered day in a month given with the name of the month and the year, or other variations, such as "Jan $5^{th}$, 2002", "8/6/20", etc. The long strings of numbers are usually associated with transaction numbers, such as invoice numbers, account IDs, etc. The common text delimiters include semicolons, pipes, periods, commas, parentheses, question marks, etc. Common tokens and/or phrases include various terms in the context of invoices that do not convey any information about the item being purchased, such as "invoice number", "fy22", "for the week ending", etc. In the second phase, the pre-processing module 212 can tokenize the extracted item descriptions, then identify and remove uninformative tokens. In particular, the pre-processing module 212 can use a first heuristics-based model, such as heuristics-based model 222 which includes three criteria to identify an informative/uninformative token. An example of the three criteria to identify an informative/uninformative token may be found in Table 1.

TABLE 1

Attributes, values, informative/uninformative for the heuristics of tokens

| Attributes | Values | Informative/Uninformative |
|---|---|---|
| Absolute frequency across entire transaction data? | Low | Uninformative |
| | High | Informative |
| Number of distinct instances the token shows up? | One | Uninformative |
| | Two and more | Informative |
| A common "stopword"? | Yes | Uninformative |
| | No | Informative |

In the third phase, the pre-processing module 212 can be programmed to convert each informative description into a Bag of Words representation based on a Bag of Words model 218. The pre-processing module 212 can use one or more natural language processing (NPL) algorithms and machine learning algorithms 214, such as a Latent Dirichlet Allocation algorithm, to determine the Bag of Words representation based on a Bag of Words model 218. The pre-processing module 212 can be programmed to apply the Bag of Words model 218 to formulate each informative description as word vectors to treat the text as an unordered collection of words. For example, an informative description, such as "UPS MEN FLAT FRONT PANT", can be converted into a word vector which is a set of the unique tokens in the description, such as ["FLAT", "FRONT", "MEN", "PANT", "UPS"]. The frequency of each word is calculated and kept as part of the Bag of Words representation. As another example, the Bag of Words model 218 can be applied to determine multi-dimensional continuous floating-point numbers for the set of unique tokens in the description (e.g., "FLAT", "FRONT", "MEN", "PANT", and "UPS") to represent two descriptions where similar word vectors for two descriptions with similar subcategories are mapped to proximate points in a geometric space. In particular, the pre-processing module 212 can be programmed to determine one or more first word vector representations, such as unlabeled transaction data features 232 stored in a repository 230, using the clean unlabeled descriptions 216. In an embodiment, the repository 230 can comprise a data store organized in the main memory of the automatic data labeling server, or in the database 130 (FIG. 1).

Likewise, the pre-processing module 212 can be programmed to determine one or more second word vector representations (e.g., sentence embedding), such as unlabeled candidate transaction data features 234 stored in the repository 230, using the clean unlabeled candidate descriptions 224. An example of word vector representation of two descriptions (e.g., 1="UPS MEN FLAT FRONT PANT" and 2="NIKE MEN TENNIS SHOE") may be found in Table 2 below:

TABLE 2

An example of word vector representation of two descriptions

| Description | Dim. 1 | Dim. 2 | Dim. 3 | Dim. 4 | Dim. 5 |
|---|---|---|---|---|---|
| 1 | 0.2 | 0.1 | −0.6 | −0.2 | 0.2 |
| 2 | 0.3 | 0.5 | 0.1 | 0.3 | 0.4 |

In an embodiment, the data label analyzer 210 is programmed to apply a heuristic-based ranking algorithm to rank the M descriptions from the clean unlabeled descriptions 216 using a second heuristics-based model, such as heuristics-based model 222. A technical benefit of the embodiment is to improve workflow for subcategory-level transaction classification and prioritization using a plurality of bands of transaction data based on band-specific metrics. In particular, the clean unlabeled descriptions 216 can be broken into several bands using metrics which attempt to determine the quality of the description.

It is important to quantify the quality of the descriptions because many frequently occurring descriptions are too vague to label at a subcategory level, such as "goods and services", etc. For example, the data label analyzer 210 can use three predetermined metrics to determine the quality of the clean unlabeled descriptions 216: 1) number of tokens in the clean unlabeled descriptions; 2) how many instances the description occurs in the clean unlabeled descriptions; 3) whether the description contains certain keywords that are indicative of transactions that are generally difficult to classify, such as "quote", "estimate", etc. Descriptions with fewer tokens are usually difficult to label. Descriptions that occur across multiple instances are usually more "standardized", detailed, and straightforward to label.

As a result, the data label analyzer 210 can be programmed to use the three predetermined metrics to classify the clean unlabeled descriptions 216 into/bands, such as seven bands. Within each band, the descriptions are ranked by a simple heuristic, such as the number of occurrences/duplicates across all transactions. The ranked descriptions provide a practical and meaningful lower bound on the predicted subcategory label for the clean unlabeled descriptions 216 because the description of a frequently occurred item, such as purchased item will often have a great deal of overlap with the descriptions of other items (e.g., "Staples Select 8.5"×11" Copy Paper 20 lbs 94 Brightness 500/Ream", can have a great deal of overlap with the descriptions of most other widely purchased copy paper products).

In an embodiment, a technical benefit of the embodiment is to improve workflow for large datasets using heuristic-based ranking algorithms and machine learning algorithms. The data label analyzer 210 is programmed to determine the clean unlabeled candidate descriptions 224 by selecting the top N descriptions, such as 1000 descriptions, from the M descriptions for the clean unlabeled descriptions 216 using the heuristic-based ranking algorithm. In particular, the data label analyzer 210 can be programmed to select top N descriptions within each band and pool them together to have L*N descriptions. Based on the top N descriptions, the data label analyzer 210 can generate a plurality of matching pairs with one description from the clean unlabeled descriptions 216 and one description from the clean unlabeled candidate descriptions 224.

The data label analyzer 210 can be programmed to calculate a similarity score 236 for each of the plurality of matching pairs using the unlabeled transaction data features 232 and the unlabeled candidate transaction data features 234. For example, the data label analyzer 210 can calculate a similarity score 236 of a value between "0" and "1" with an approximate-matching implementation that scales suitably well for the mathematics problem, such as Jaccard similarity based on Equation 1. As another example, a matching pair can be assigned a similarity value of "0" when the descriptions in the matching pair share no common tokens. Likewise, wherein the matching pair has a similarity value of "1" when the descriptions in the matching pair have identical transaction data features. As a result, the data label analyzer 210 can be programmed to reduce the number of similarity scores from a very large number, such as M*M, to a much smaller number, such as N*M. The similarity score based on Jaccard similarity is a very efficient approximate method for finding pairs of sets with high Jaccard similarity. It is based on locality-sensitive hashing (LSH) and uses sophisticated mathematical techniques to identify most similar matching pairs present with considerably fewer than N*M similarity calculations.

$$J(A, B) = \frac{|A \cap B|}{|A \cup B|} = \frac{|A \cap B|}{|A| + |B| - |A \cap B|} \quad \text{Equation 1}$$

where A is a description from the clean unlabeled descriptions, B is a description from the clean unlabeled candidate descriptions, A ∩ B is an intersection of A and B, and |A∪B| is a union of A and B, | | is an absolute value of a word vector for a description. The descriptions must be represented as sets to calculate matching pairs using Jaccard similarity in this fashion, hence the usefulness of Bag of Words and other set-based representations of unstructured text in this context.

In an embodiment, the data label analyzer 210 is programmed to determine a plurality of ranking values 238 for the N clean unlabeled candidate descriptions based on a statistical analysis of the similarity scores 236 between the clean unlabeled descriptions 216 and the clean unlabeled candidate descriptions 224. For example, the statistical analysis is based on the number of high similarity matches which the unlabeled candidate transaction data features 234 of the clean unlabeled candidate descriptions 224 have to the unlabeled transaction data features 232 of the full set of the clean unlabeled descriptions 216. The clean unlabeled candidate descriptions 224 can be ranked by the number of the best-match clean unlabeled candidate descriptions 224 with the highest similarity score above a predetermined high-similarity threshold. For example, the high-similarity threshold for a given band A may be 0.3; in other words, if the similarity between a candidate from band A and an unlabeled description is greater than 0.3, the unlabeled description is very likely to have the same subcategory as the candidate. In this scenario, if candidate $A_1$ is the nearest neighbor of 10,000 unlabeled transactions (among all possible candidates in band A) and candidate $A_2$ is the nearest neighbor of 20,000 unlabeled transactions, $A_2$ will be ranked higher than $A_1$ for labeling prioritization, provided all 30,000 of the candidate-unlabeled pairs in question have similarity 0.3 or greater. Alternatively, the clean unlabeled candidate descriptions 224 can be ranked by the number of the good-match clean unlabeled descriptions 216 with good similarity scores above a predetermined good-similarity threshold. The best-match or good-match clean unlabeled candidate descriptions 224 can be determined using the machine learning model 220, such as a k-Nearest Neighbor (kNN) algorithm. The initial thresholds for high-similarity and good-similarity can be based on manual examination of matching pairs, and they can be adjusted during a validation process.

In an embodiment, the data label analyzer 210 is programmed to determine a subcategory label 240 for the clean unlabeled candidate descriptions 224 associated with the unlabeled candidate transaction data 114 based on the plurality of ranking values 238 for the clean unlabeled candidate descriptions. The data label analyzer 210 can assign a plurality of subcategory labels for the clean unlabeled candidate descriptions 224 using a suitable method, such as manual or machine learning-driven automatic labeling. If a similarity score between a manually labeled description and an unlabeled candidate description is sufficiently high, it is reasonable that the subcategory label for the manually labeled description can be assigned to the unlabeled candidate description. Furthermore, there is a direct relationship between similarity and accuracy (i.e., as the similarity between matching pairs increases, the direct subcategory predictions become more accurate). Therefore, the data label analyzer 210 can be programmed to determine the subcategory label of an unlabeled candidate description based on the subcategory label of the candidate description with the highest similarity, provided said similarity is above the requisite threshold for high alignment/accuracy. In an embodiment, the data label analyzer 210 is programmed to validate the effectiveness of the ranking of the candidate descriptions by quantifying the alignment of subcategory labels for various degrees of similarity through manual labeling on a stratified sample of matching pairs. In particular, the stratification of the matching pairs is determined based on the plurality of bands of the candidate descriptions. The matching pairs with higher similarity should align more frequently than the matching pairs with lower similarity. That is, the similarity scores of the matching pairs are correlated with a label alignment. For example, the matching pairs with a similarity of 0.5 may have the same subcategory more than 90% of the time, whereas matching pairs with a similarity of 0.2 may only have the same subcategory 40% of the time. In internal use cases and testing, there were many high-similarity matching pairs for the full set of unlabeled descriptions, even for a small number of manually labeled candidates.

In an embodiment, the data label analyzer 210 is programmed to rank and recommend candidate descriptions for manual labeling. In particular, the data label analyzer 210 can use band-specific high-confidence similarity thresholds, such as a similarity threshold beyond which the matching pairs have a likelihood of 0.8 or greater for a particular subcategory label. After the recommended candidate descriptions are labeled, the data label analyzer 210 can combine these thresholds with the candidate-unlabeled similarities to make high-confidence predictions.

In an embodiment, the data label analyzer 210 is programmed to train the machine learning models 220 on a small set of labeled transaction data to make subcategory label predictions on a large set of unlabeled transaction data. The small set of labeled transaction data can be obtained by manually labeling the unlabeled candidate transaction data in a pool-based process. Alternatively, if model-derived probabilistic predictions for subcategory labels are already available, the small set of labeled transaction data can be obtained one at a time and manually labeled based on some quantitative criteria in a stream-based process. There is an uncertainty value associated with the subcategory label which can be determined based on four different metrics: 1) the lowest predicted probability of the subcategory labels, 2) maximum entropy of the subcategory labels, 3) maximum disagreement of the subcategory labels across the unlabeled candidate transaction invoice data, and 4) maximum number of prediction changes of the subcategory labels during the machine model training.

In an embodiment, the data label analyzer 210 is programmed to identify and rank one or more queries using unlabeled candidate transaction data after labeling. For example, a user may use the data label analyzer 210 to find a frequently asked question (FAQ) based on a user input query "How do I modify an invoice?". The data label analyzer 210 can be used to improve search output by taking a large set of unlabeled search queries as input and identifying the highest-value candidate queries to label by applying the aforementioned ranking and prioritization algorithm. The data label analyzer 210 can also be used in a voice-driven phone support device to enhance phone support performance and customer feedback based on the user input that may be overlooked under the existing system. For example, the user input can be text transcriptions of a customer response to prompts such as "In few words, please describe what you need help with." User input can also be e-mails or input to short feedback forms on webpages, which are unstructured and unlabeled text data that often come in large volumes. The data label analyzer 210 can identify the highest-value emails, feedback forms, etc., to label, leading to larger improvements in the performance of downstream machine learning models which utilize such data as inputs (e.g., auto-generated email responses to customer feedback).

3. Procedural Overview

Figure 3:
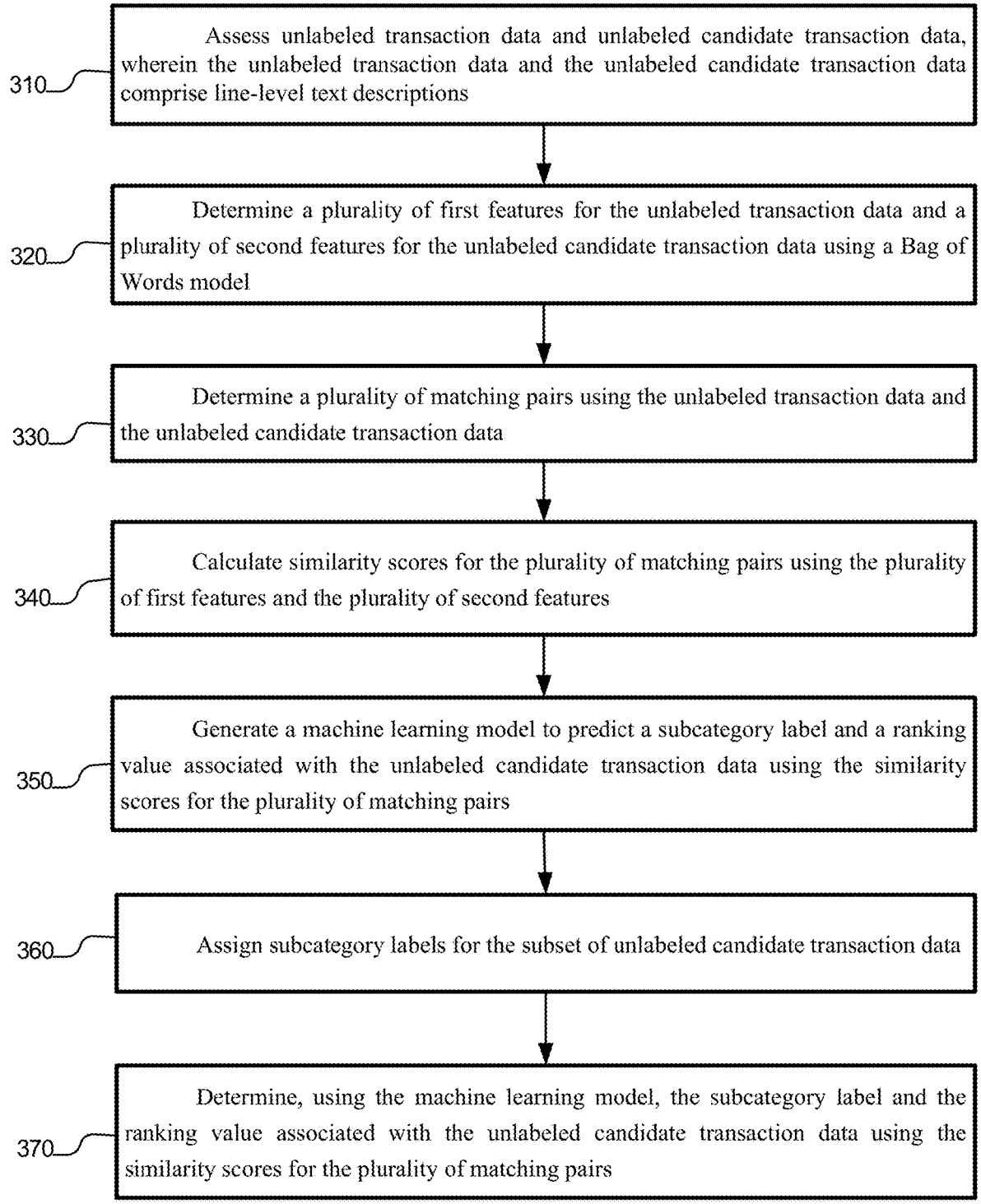
FIG. 3 shows a flow chart of a method of determining a subcategory label and a ranking value for unlabeled candidate transaction data in accordance with one or more embodiments.

FIG. 3 shows a flow chart of a method of determining a subcategory label and a ranking value for unlabeled candidate transaction data in accordance with one or more embodiments. FIG. 3 can be programmed to implement a general workflow to apply a machine learning model to assess similarity scores for a plurality of matching pairs of unlabeled transaction data and unlabeled candidate transaction data. One or more blocks in FIG. 3 may be performed by one or more components as described in FIG. 1 and FIG. 2; for example, the automatic data labeling server 150 can be programmed, using one or more sequences of instructions, to execute an implementation of FIG. 3. While the various blocks in FIG. 3 are presented and described sequentially, one of ordinary skill in the art will appreciate that some or all the blocks may be executed in different orders, may be combined or omitted, and some or all the blocks may be executed in parallel. Furthermore, the blocks may be performed actively or passively.

FIG. 3 and each other flow diagram herein is intended as an illustration at the functional level at which skilled persons, in the art to which this disclosure pertains, communicate with one another to describe and implement algorithms using programming. The flow diagrams are not intended to illustrate every instruction, method, object or sub-step that would be needed to program every aspect of a working program, but are provided at the same functional level of illustration that is normally used at the high level of skill in this art to communicate the basis of developing working programs.

In Block 310, unlabeled transaction data is pre-processed in accordance with one or more embodiments. Accordingly, the automatic data labeling server 150 may apply pre-processing to the unlabeled transaction data and the unlabeled candidate transaction data. For example, the automatic data labeling server 150 can perform extensive regex-based item description cleaning to extract item descriptions by removing common tokens that have no bearing on the item being purchased. As another example, the automatic data labeling server 150 can tokenize the extracted item descriptions, then identify and remove uninformative tokens. As a result, the automatic data labeling server 150 can determine pre-processed unlabeled candidate descriptions using the unlabeled candidate transaction data and the pre-processed unlabeled descriptions using unlabeled transaction data, respectively. In some embodiments, the item descriptions are extracted at an invoice line level. When the transaction data is not related to an invoice, then the pre-processing can be of other unstructured text descriptions, such as commodities, suppliers, etc. Although not illustrated, it is noted that at the outset all transaction data may be unlabeled, and that over time, as method 300 operates, transaction data starts to be labeled.

In Block 320, a plurality of first features for the unlabeled transaction data 112 and a plurality of second features for the unlabeled candidate transaction data 114 are determined using a quantitative representation, such as a Bag of Words model, in accordance with one or more embodiments. The automatic data labeling server 150 can convert each of the pre-processed unlabeled descriptions into a word vector using the Bag of Words model. For example, a description, such as "UPS MEN FLAT FRONT PANT", can be converted into a word vector which is a set of the unique tokens in the description, such as ["FLAT", "FRONT", "MEN", "PANT", "UPS"]. As another example, the automatic data labeling server 150 can determine multi-dimensional continuous floating-point numbers for the set of unique tokens in the description (e.g., "FLAT", "FRONT", "MEN", "PANT", and "UPS") to represent two descriptions where similar word vectors for two descriptions with similar subcategories are mapped to proximate points in a geometric space.

In Block 330, the automatic data labeling server 150 can determine a subset of the clean descriptions by selecting the top N descriptions using the clean descriptions based on a heuristic-based ranking algorithm. For example, the heuristic can rank candidate descriptions by the number of exact matches (i.e., duplicates) for each description in the full unlabeled transaction data. In one embodiment, the subset is much smaller than the original set of unlabeled transaction data; this reduces the number of similarity scores that need to be calculated at block 340, and accordingly reduces computational time and resources needed. For example, the size of the subset may be on the order of thousands, while the size of the original set may be on the order of millions. In other embodiments where computational time and resources are not constrained, the subset selected may be larger.

In Block 340, similarity scores are calculated for the plurality of matching pairs using the top N descriptions calculated in the previous step and the full set of unlabeled transaction data, where each matching pair consists of one top-ranked candidate (from the full set of cleaned unlabeled candidates 224 selected at block 330) and one unlabeled description from the full set of cleaned unlabeled descriptions 216. The automatic data labeling server 150 can calculate a similarity score for each of the plurality of matching pairs using any suitable algorithm, such as LSH-based Jaccard similarity.

In Block 350, the automatic data labeling server 150 determines a plurality of ranking values for the clean candidate descriptions (determined in block 330) based on a statistical analysis of the similarity scores (determined in block 340) for the plurality of matching pairs. For example, the subset of the clean unlabeled descriptions 216 can be ranked by the number of the best-match clean unlabeled candidate descriptions with the highest similarity score. This metric (number of times each candidate is the highest-similarity match for an unlabeled candidate transaction) can not only serve as a ranking criteria, but can also provide a meaningful estimate of the marginal benefit (i.e., number of resultant high-confidence predictions) of labeling each of the N ranked candidate descriptions for some machine learning models. Note that the highest-similarity match for a given unlabeled candidate transaction may be very low-similarity, hence the need for empirically-derived high-confidence similarity thresholds which are computed upfront.

In Block 360, subcategory labels for the unlabeled candidate transaction data selected at Block 330 are assigned using a suitable method, such as manual or machine learning-driven automatic labeling.

In Block 370, subsequent to the unlabeled candidate transaction data being labeled, the automatic data labeling server 150 can predict the subcategory label for the unlabeled transaction data using the subcategory labels for the clean candidate descriptions and the similarity scores for the plurality of matching pairs. Based on the labeled candidate transaction data, the automatic data labeling server 150 can use a machine learning model to predict the subcategory label and the ranking values for the unlabeled transaction data. For example, a nearest-neighbor model can reuse the plurality of similarity scores calculated in Block 340 to generate predictions for the full set of unlabeled transaction data. In particular, a KNN model (subject to the high-confidence thresholding described previously) will generate a number of high-confidence predictions for each candidate labeled in Block 360 equal to the ranking criteria for each candidate calculated in Block 350, provided the appropriate model parameters are selected.

After the predictions are made in Block 370, high-confidence predictions are removed from the original pool of unlabeled transaction data. Then, method 300 can be rerun on the new, smaller subset of unlabeled transaction data to produce the next batch of top N candidates to label and generate predictions from. For example, prior to the first run of method 300, 10 million unlabeled transactions may be in our original dataset; after running method 300 and labeling the top 1000 candidates, we may be able to generate 1 million high-confidence predictions. After removing these 1 million high-confidence predictions, we can then rerun method 300 on the remaining 9 million unlabeled transactions, generate a new batch of 1000 candidates to label, etc. In this manner, collectively, method 300 and its constituent blocks are programmed to generate a ranking value for each description in the unlabeled transaction data using the similarity scores for the plurality of matching pairs, then create and store a machine learning model which predicts subcategory labels in an inference stage for the original unlabeled transaction dataset.

4. Implementation Example

Figure 4A:
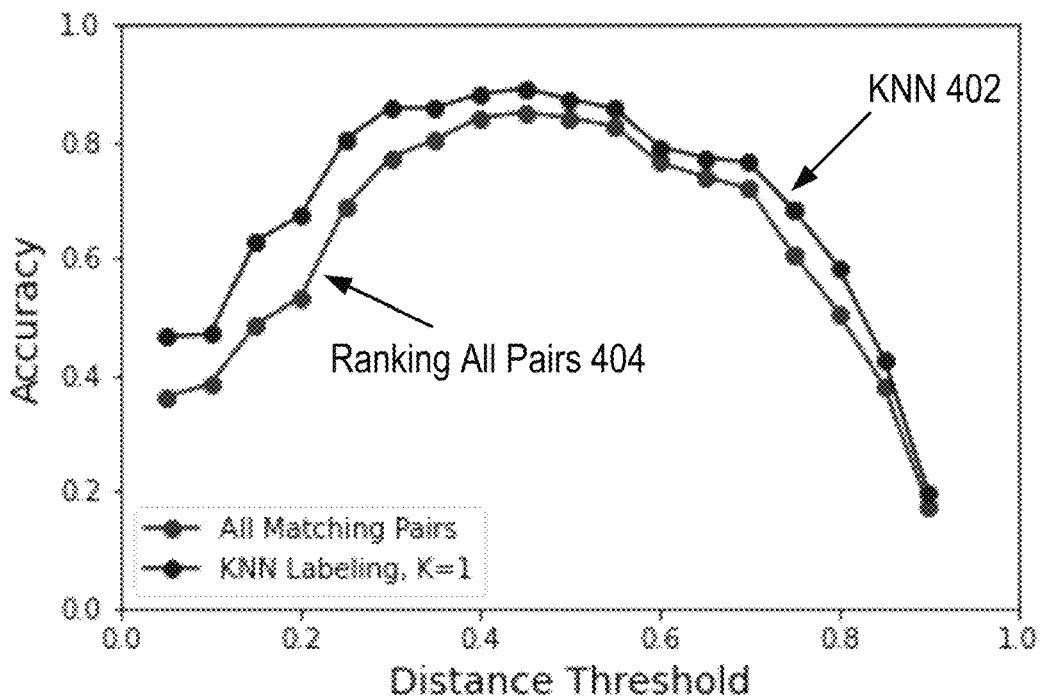
FIGS. 4A, FIG. 4B, FIG. 4C, FIG. 4D, and FIG. 4E show examples of prediction accuracy on unlabeled transaction data and unlabeled candidate transaction data in accordance with one or more embodiments.

FIGS. 4A, FIG. 4B, FIG. 4C, FIG. 4D, and FIG. 4E show examples of prediction accuracy on both labeled and unlabeled transaction data in accordance with one or more embodiments. FIG. 4A shows a visualization of accuracy and distance threshold for predicted subcategory labels using a KNN method 402 and a ranking all pairs method 404 based on labeled transaction data and unlabeled candidate transaction data. These results were compiled by labeling the top 100 unlabeled candidate descriptions generated by an early iteration of the ranking algorithm, then using these 100 newly-labeled descriptions to make subcategory predictions on a large, labeled dataset containing descriptions and their associated subcategory labels. The distance threshold is the difference between a value of "1" and a similarity score for a matching pair of descriptions. Thus, the matching pair of descriptions has a great degree of similarity for a low distance threshold. The data label server 150 applies the KNN method 402 to predict the subcategory label of the nearest neighbor from the manually labeled candidate data for each of the descriptions in the reference labeled dataset. Likewise, the data label server 150 applies the ranking all pairs method 404 to quantify the general relationship between Jaccard similarity and subcategory label alignment for candidate-unlabeled pairs. This is accomplished by binning all matching pairs generated by LSH-based approximate Jaccard similarity matching into narrow similarity bands (e.g., 0.1-0.2, 0.2-0.3, etc.) and calculating the degree of subcategory alignment (e.g., the percentage of times the descriptions in the matching pair have the same subcategory) within each similarity band. For example, the data label server 150 can use KNN method 402 to correctly predict subcategory labels for 7 descriptions from a total of 15 descriptions for an accuracy value of "0.467" for a cutoff distance threshold of "0.05". Likewise, the data label server 150 can use ranking all pairs method 404 to correctly predict subcategory labels for 8 descriptions from a total of 22 descriptions for an accuracy value of "0.364" for the same cutoff threshold distance of "0.05". FIG. 4A clearly shows that the accuracy reaches a peak of about "0.9" for a cutoff distance threshold of "0.45" using a KNN model with K=1, illustrating the high degree of alignment (and consequently high predictive power) for matching pairs below that threshold. In practice, the alignment remains fairly high well beyond a similarity of 0.45, suggesting that a looser threshold may be practical when making predictions. FIG. 4A also shows the accuracy value for the KNN method 402 is slightly better than the accuracy value for the ranking all pairs method 404. An example of verification on unlabeled candidate transaction data may be found in Table 3 below (note that the cutoff bins and totals are cumulative; e.g., for All Pairs verification, the 26 descriptions for cutoff=0.1 includes all 22 of the descriptions for cutoff=0.05):

TABLE 3

An example of verification on labeled transaction data.

| Verification Type | Cutoff | Total Pairs | Aligned Pairs | Aligned Proportion |
|---|---|---|---|---|
| All Pairs | 0.05 | 22 | 8 | 0.364 |
| All Pairs | 0.1 | 26 | 10 | 0.385 |
| All Pairs | 0.15 | 41 | 20 | 0.488 |
| All Pairs | 0.2 | 120 | 64 | 0.533 |
| All Pairs | 0.25 | 202 | 139 | 0.688 |
| All Pairs | 0.3 | 372 | 288 | 0.774 |
| All Pairs | 0.35 | 934 | 751 | 0.804 |
| All Pairs | 0.4 | 1,818 | 1,530 | 0.842 |
| All Pairs | 0.45 | 3,528 | 3,002 | 0.851 |
| All Pairs | 0.5 | 9,690 | 8,159 | 0.842 |
| All Pairs | 0.55 | 13,305 | 11,005 | 0.827 |
| All Pairs | 0.6 | 24,909 | 19,051 | 0.765 |
| All Pairs | 0.65 | 40,831 | 30,249 | 0.741 |
| All Pairs | 0.7 | 79,584 | 57,287 | 0.72 |
| All Pairs | 0.75 | 163,838 | 99,359 | 0.606 |
| All Pairs | 0.8 | 325,966 | 165,023 | 0.506 |
| All Pairs | 0.85 | 670,286 | 256,029 | 0.382 |
| All Pairs | 0.9 | 2,428,817 | 419,557 | 0.173 |
| Nearest Neighbor | 0.05 | 15 | 7 | 0.467 |
| Nearest Neighbor | 0.1 | 17 | 8 | 0.471 |
| Nearest Neighbor | 0.15 | 27 | 17 | 0.63 |
| Nearest Neighbor | 0.2 | 89 | 60 | 0.674 |
| Nearest Neighbor | 0.25 | 164 | 132 | 0.805 |
| Nearest Neighbor | 0.3 | 320 | 275 | 0.859 |
| Nearest Neighbor | 0.35 | 842 | 723 | 0.859 |
| Nearest Neighbor | 0.4 | 1,669 | 1,474 | 0.883 |
| Nearest Neighbor | 0.45 | 3,249 | 2,897 | 0.892 |
| Nearest Neighbor | 0.5 | 9,043 | 7,904 | 0.874 |
| Nearest Neighbor | 0.55 | 12,422 | 10,656 | 0.858 |
| Nearest Neighbor | 0.6 | 22,946 | 18,174 | 0.792 |
| Nearest Neighbor | 0.65 | 36,105 | 27,953 | 0.774 |

TABLE 3-continued

An example of verification on labeled transaction data.

| Verification Type | Cutoff | Total Pairs | Aligned Pairs | Aligned Proportion |
|---|---|---|---|---|
| Nearest Neighbor | 0.7 | 64,351 | 49,208 | 0.765 |
| Nearest Neighbor | 0.75 | 114,939 | 78,526 | 0.683 |
| Nearest Neighbor | 0.8 | 210,292 | 122,606 | 0.583 |
| Nearest Neighbor | 0.85 | 405818 | 173,905 | 0.429 |
| Nearest Neighbor | 0.9 | 1,238,374 | 242,508 | 0.196 |

Figure 4B:
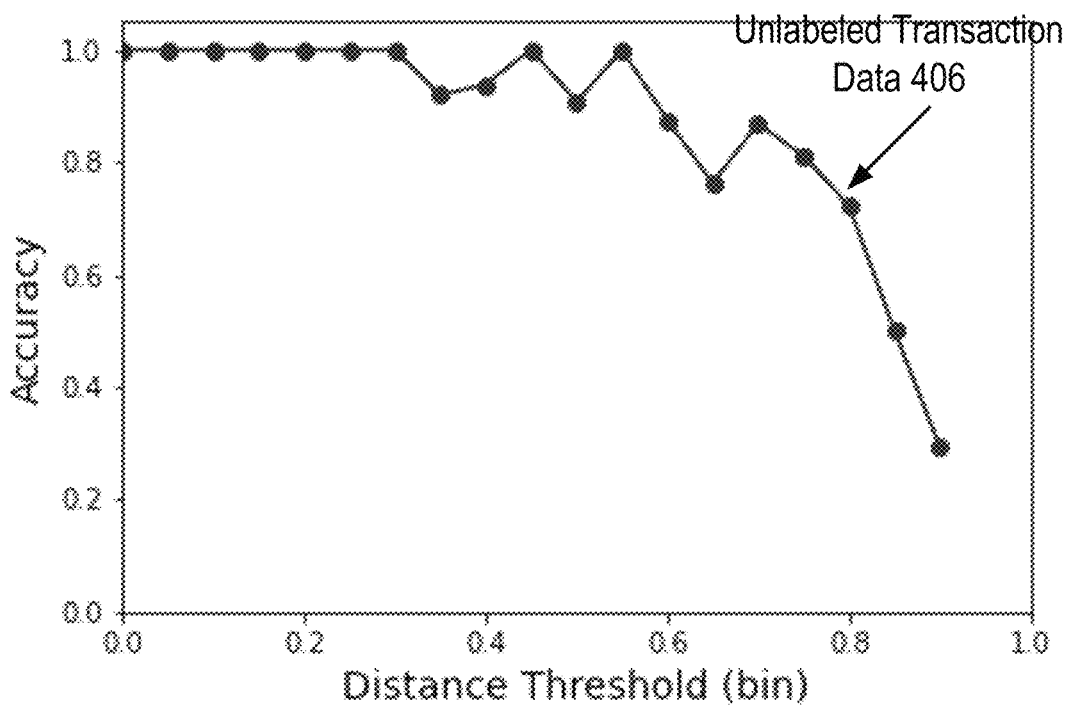

FIG. 4B shows an example of accuracy and distance threshold for predicted subcategory labels using unlabeled candidate transaction data 406. The data label server 150 applies a stratified sample of matching pairs of candidate-unlabeled descriptions. In particular, the data label server 150 uses approximately 40 matching pairs for each of the distance threshold bins: 0-0.05, 0.05-0.1, 0.1-0.15, 0.15-0.2, 0.2-0.25, 0.25-0.3, 0.3-0.35, 0.35-0.4, 0.4-0.45, 0.45-0.5, 0.5-0.55, 0.55-0.6, 0.6-0.65, 0.65-0.7, 0.7-0.75, 0.75-0.8, 0.8-0.85, 0.85-0.9, 0.9-0.95. For each distance threshold bin, both the target unlabeled candidate description and the target unlabeled description in each matching pair are manually labeled. The same top ranked 100 candidate descriptions are used as in FIG. 4A; however, unlike FIG. 4A, this validation is done against unlabeled transaction data, hence the need for sampling and stratification. In the absence of a large, labeled dataset (as was available in FIG. 4A), high-confidence similarity thresholds can be calculated on stratified, manually labeled samples of unlabeled data, as illustrated here. FIG. 4B shows the predicted subcategory labels for the unlabeled candidate transaction data 406 show very good accuracy with a value above "0.8" for a distance threshold below 0.6. An example of verification on unlabeled candidate transaction data may be found in Table 4 below:

TABLE 4

An example of verification on unlabeled candidate transaction data.

| Distance Bin | Total Sample Pairs | Aligned Sample Pairs | Aligned Proportion | Total Unlabeled Count (Within Bin) | Cumulative Unlabeled Count |
|---|---|---|---|---|---|
| 0 | 38 | 38 | 1 | 17,432 | 17,432 |
| 0.05 | 2 | 2 | 1 | 34 | 17,466 |
| 0.1 | 15 | 15 | 1 | 598 | 18,064 |
| 0.15 | 24 | 24 | 1 | 1,445 | 19,509 |
| 0.2 | 47 | 47 | 1 | 3,473 | 22,982 |
| 0.25 | 31 | 31 | 1 | 6,456 | 29,438 |
| 0.3 | 51 | 51 | 1 | 5,090 | 34,528 |
| 0.35 | 37 | 34 | 0.919 | 10,578 | 45,106 |
| 0.4 | 32 | 30 | 0.938 | 10,207 | 55,313 |
| 0.45 | 34 | 34 | 1 | 11,094 | 66,407 |
| 0.5 | 43 | 39 | 0.907 | 20,642 | 87,049 |
| 0.55 | 20 | 20 | 1 | 8,257 | 95,306 |
| 0.6 | 48 | 42 | 0.875 | 27,436 | 122,742 |
| 0.65 | 42 | 32 | 0.762 | 19,458 | 142,200 |
| 0.7 | 38 | 33 | 0.868 | 39,989 | 182,189 |
| 0.75 | 37 | 30 | 0.811 | 114,759 | 296,948 |
| 0.8 | 43 | 31 | 0.721 | 177,957 | 474,905 |
| 0.85 | 36 | 18 | 0.5 | 275,899 | 750,804 |
| 0.9 | 48 | 14 | 0.292 | 1,019,969 | 1,770,773 |

Figure 4C:
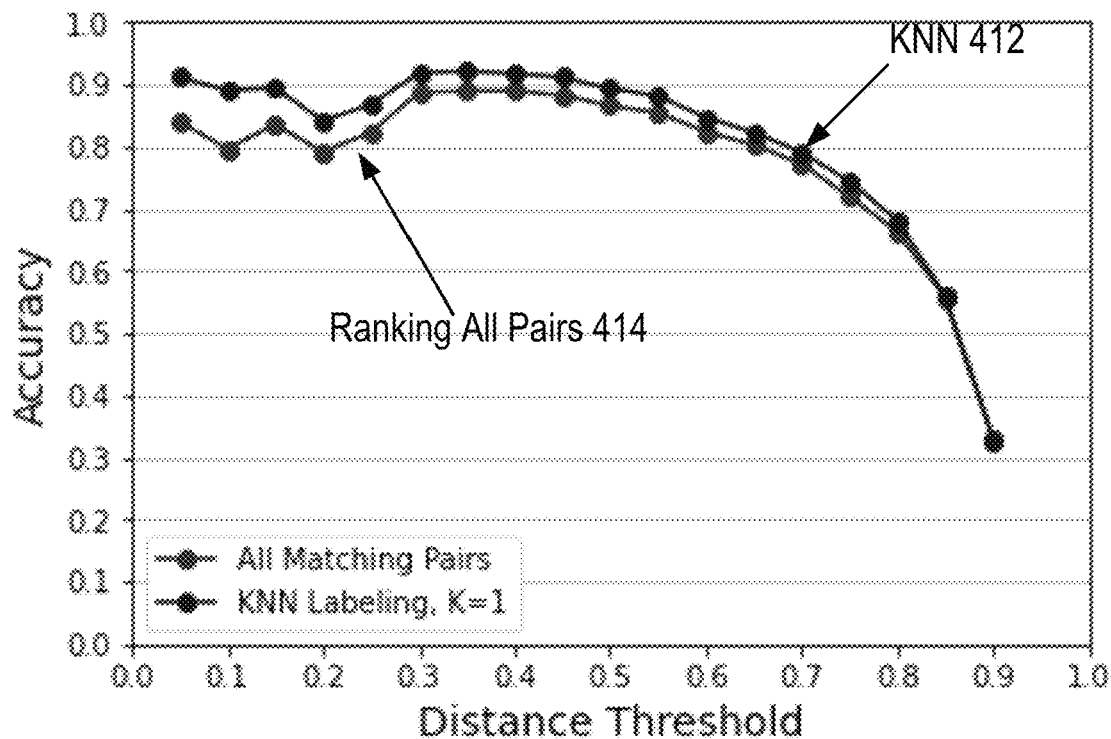
Figure 4D:
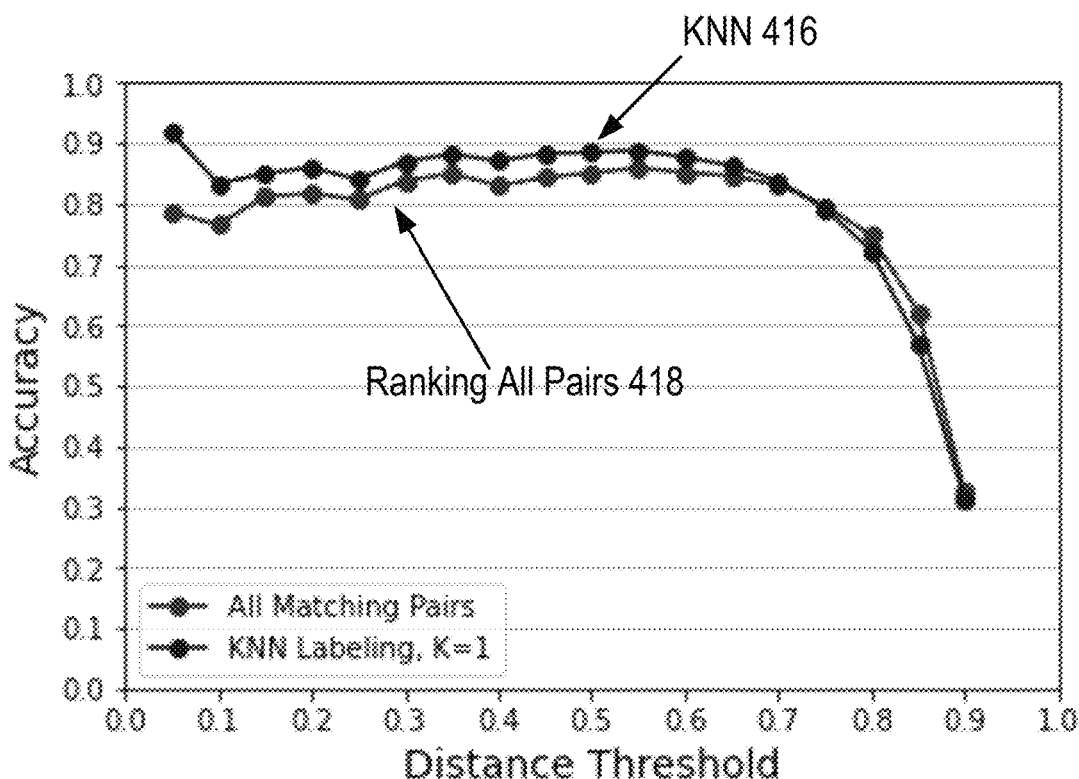

FIG. 4C and FIG. 4D show an example of accuracy and distance threshold for predicted subcategory labels using the KNN method and the ranking all pairs method based on the labeled transaction data after refinements to the aforementioned ranking process. The first refinement is that data label server 150 removes certain classes of descriptions which are known to be problematic (i.e., frequently have low-quality descriptions) from consideration through a keyword filter. This step removes about 20 candidates that are previously under consideration for ranking. In addition, the data label server 150 applies a more aggressive regex cleaning to clean the descriptions, resulting in fewer uninformative tokens and greater overall standardization of descriptions. Finally, the data label server 150 now iteratively ranks each of the about 3500 top-ranked candidates one at a time by calculating a margin gain in new transactions that can be confidently labeled for each candidate at each step, enabling a more direct comparison to a random baseline without applying heuristics-based filtering to remove similar candidates. A new ranking metric is the number of matched transactions or descriptions with high confidence with a similarity score greater than 0.3. Based on the clean unlabeled candidate transaction data, the data label server 150 selects the top 100 ranked candidates, a random sample of 100 candidates, or a stratified sample of about 1000 candidate-unlabeled match pairs for processing, then makes predictions against the same large, labeled dataset referenced in FIG. 4A FIG. 4C shows the predicted subcategory labels have much improved accuracy for both the KNN method 412 and the ranking all pairs method 414 for the top 100 ranked candidates. The curve exhibits a shape much closer to expected (i.e., monotonically decreasing accuracy with increasing distance/decreasing similarity) after the aforementioned refinements.

FIG. 4D also shows the predicted subcategory labels have much improved accuracy for both the KNN method 416 and the ranking all pairs method 418 for the random sample of 100 candidates.

Using the results in FIGS. 4C and 4D, data label server 150 can generate distance thresholds corresponding to high-confidence predictions using the KNN method 412 and 416. For example, it is apparent from the figures that the label alignment between labeled and unlabeled candidate descriptions drops below 80% around a distance of 0.7. Therefore, when manual labeling of top-ranked candidates and subsequent subcategory prediction for unlabeled candidate descriptions is performed on a larger scale, it is reasonable to only keep nearest-neighbor predictions for which the nearest-neighbor candidate is a Jaccard distance of 0.7 or lower from the unlabeled candidate description. This combination of a nearest-neighbor modeling approach with empirically-derived distance thresholds ensures high prediction and candidate ranking quality, as well as a meaningful estimate of the marginal benefit of labeling the next highest-ranked candidate.

Figure 4E:
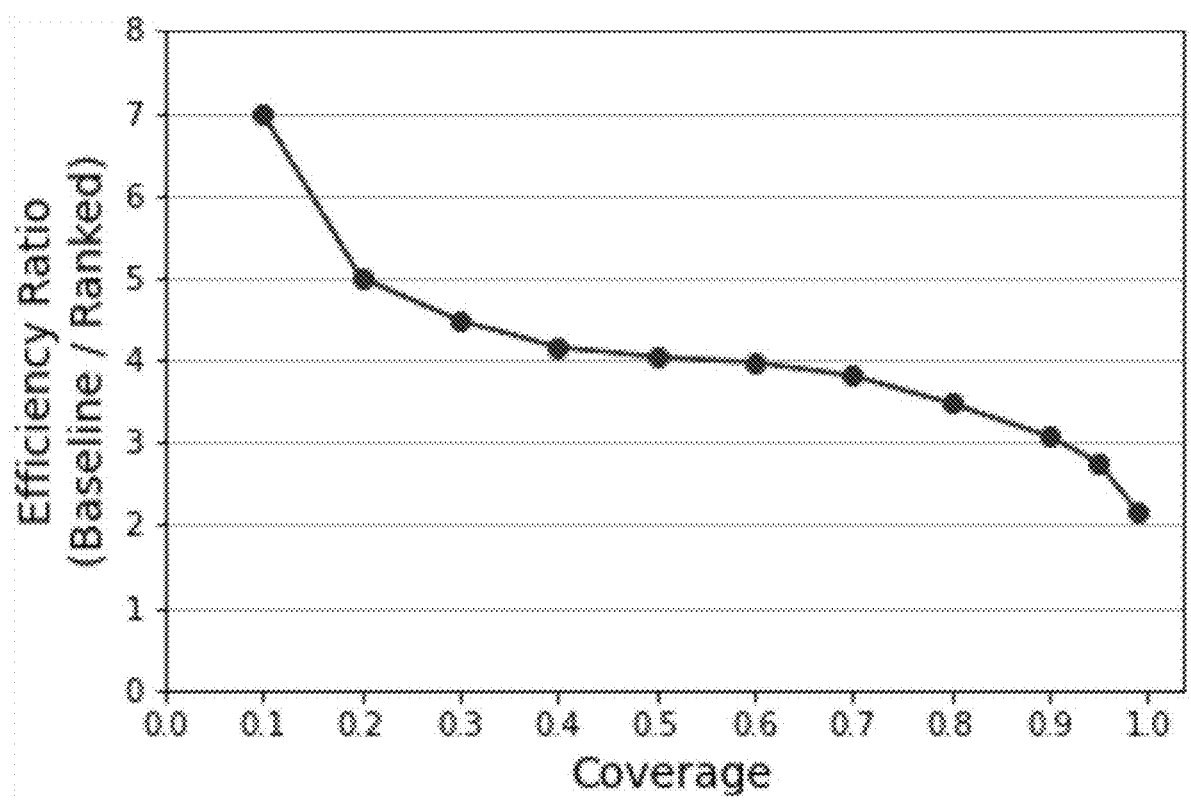

FIG. 4E shows an example of estimated efficiency gain from ranking candidates compared to baseline data which is a random sample of 100 candidates of the clean unlabeled candidate transaction data. The data label server 150 calculates the efficiency gain in producing high-confidence predictions due to ranking for a distance threshold of less than 0.7. As a result, there are approximately 520,000 transactions with a high-confidence matching pair with one or more of the ~3500 candidates. Coverage is defined as the percentage of these ~520,000 transactions that can be assigned a high confidence label after the specified amount of manual labeling was completed. Efficiency gain is defined as the ratio of two quantities: the number of top-ranked candidates and the number of randomly selected candidates that need to be labeled to achieve a particular coverage. The latter value has inherent variability due to randomness, requiring simulation or some other appropriate technique to generate a robust estimate for said value. Note that this calculation only quantifies the value of ranking the candidates using LSH-based Jaccard similarity after applying the initial cleaning steps and rule-based heuristic; it does not account for the efficiency gain attributable to the use of the initial heuristic itself, nor the gains due to banding, regex and keyword cleaning, etc., which may be considerable. FIG. 4E shows that the efficiency gain from ranking candidates generally decreases with increasing coverage; in other words, the ranking algorithm provides the most benefit in the earliest stages of manually labeling a set of algorithmically ranked candidates. An example of verification on estimated efficiency gain from ranking candidates compared to baseline data may be found in Table 5 below:

TABLE 5

An example of estimated efficiency gain from ranking candidates compared to baseline data.

| Coverage | Number of High Confidence Labels Produced | Manual Labeling Required (Ranked) | Manual Labeling Required (Baseline) | Efficiency Ratio |
|---|---|---|---|---|
| 0.1 | 52334 | 5 | 35 | 7 |
| 0.2 | 104669 | 14 | 70 | 5 |
| 0.3 | 157003 | 29 | 130 | 4.48 |
| 0.4 | 209338 | 53 | 220 | 4.15 |
| 0.5 | 261672 | 88 | 355 | 4.03 |
| 0.6 | 314006 | 145 | 575 | 3.97 |
| 0.7 | 366341 | 239 | 910 | 3.81 |
| 0.8 | 4186675 | 396 | 1375 | 3.47 |
| 0.9 | 471010 | 692 | 2125 | 3.07 |
| 0.95 | 497177 | 967 | 2670 | 2.76 |
| 0.99 | 518111 | 1500 | 3245 | 2.16 |

Figure 5:
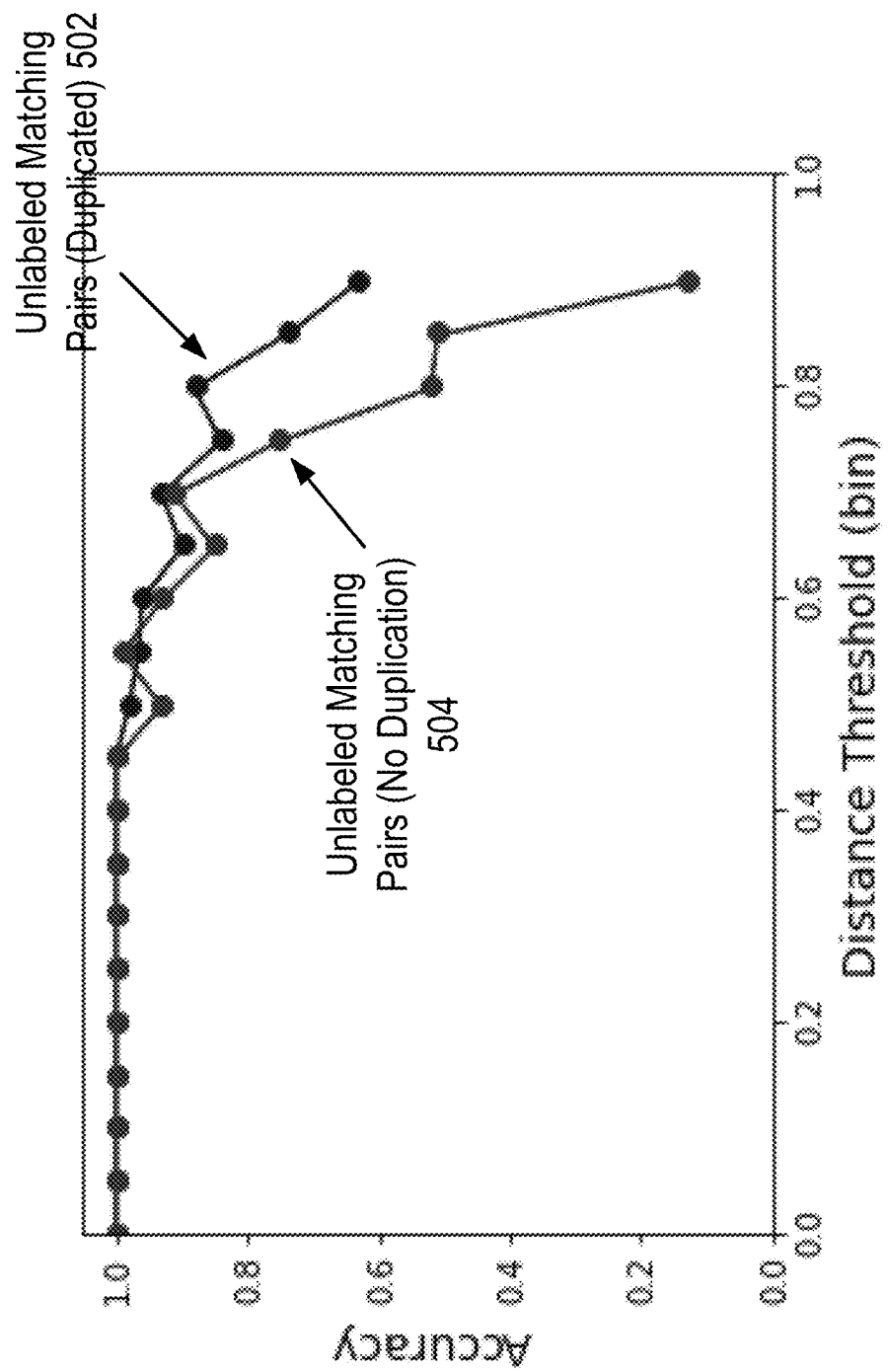
FIG. 5 shows an example of predicted subcategory labels on unlabeled candidate transaction data with and without a duplication constraint in accordance with one or more embodiments.
Figure 6A:
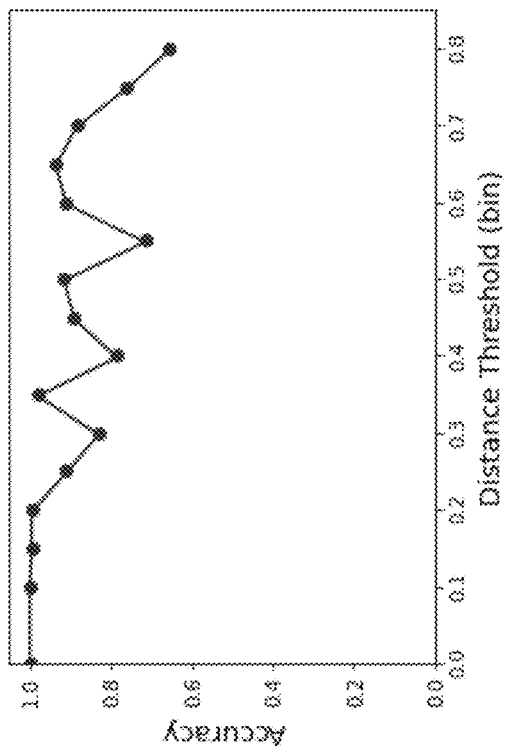
FIGS. 6A, FIG. 6B, FIG. 6C, and FIG. 6D show examples of predicted subcategory labels on a plurality of bands based on unlabeled candidate transaction data in accordance with one or more embodiments.
Figure 6B:
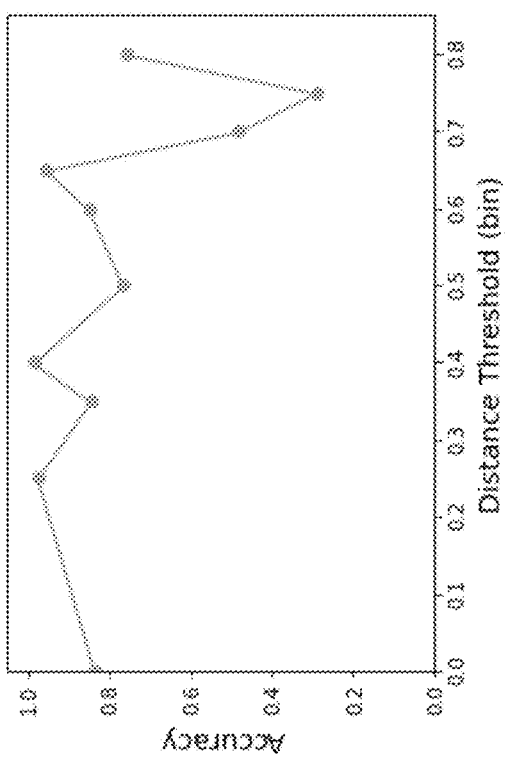
Figure 6C:
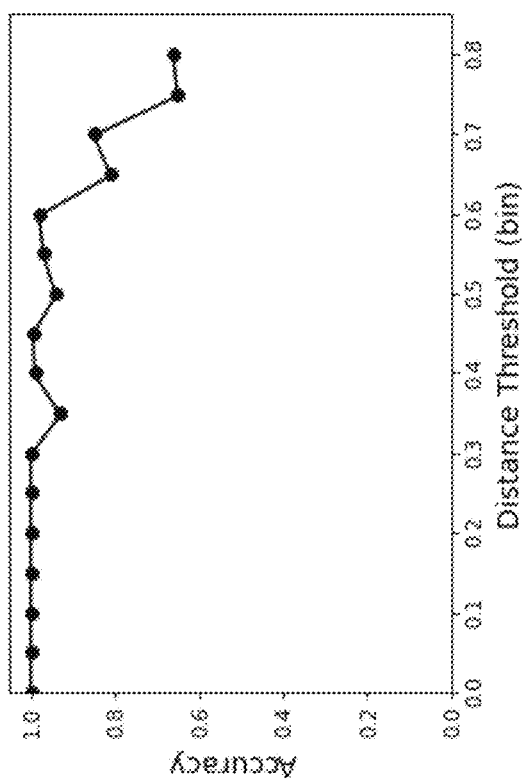
Figure 6D:
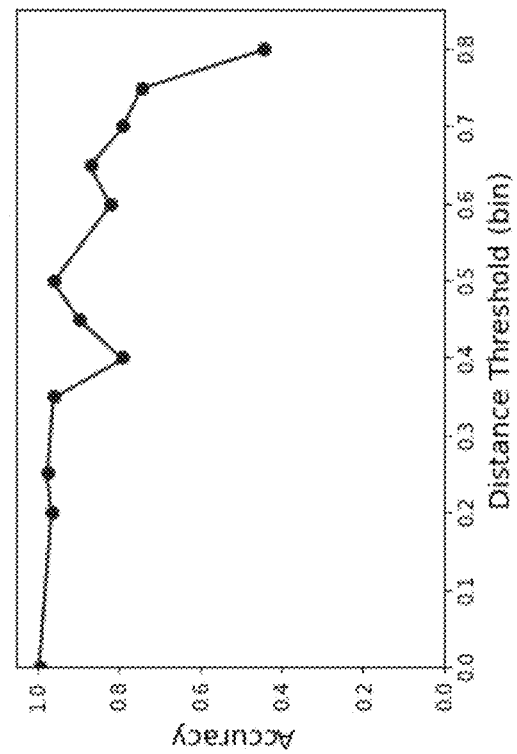

FIG. 5 shows an example of predicted subcategory labels on unlabeled transaction data with and without duplication constraints in accordance with one or more embodiments. The data label server 150 applies the duplication constraint to limit each candidate to only being considered once per bin because some candidates dominate certain bins and show up more than 10 times without such a restriction. FIG. 5 shows that the predicted subcategory labels for unlabeled matching pairs with the duplication constraint 502 show an accuracy improvement of 63% than the predicted subcategory labels for unlabeled matching pairs without the duplication constraint 504 in the distance threshold range of 0.85-0.9. The improvement indicates that the deduplication process inadvertently has some sorting in place which consistently leads to much longer (and usually much higher quality) unlabeled candidate descriptions being selected than in the true random sample. This observation suggests that further stratifying the low-similarity matching pairs (e.g., in the range of 0.1-0.25) by the absolute number of overlapping tokens (i.e., the numerator of the Jaccard similarity) may help identify subsets of these low-similarity matches that have high alignment. For example, 3 overlapping tokens out of 15 tokens produced much higher alignment than 1 token out of 5 tokens, despite both scenarios corresponding to a Jaccard similarity of 0.2.

FIG. 6A, FIG. 6B, FIG. 6C, and FIG. 6D show examples of predicted subcategory labels on a plurality of bands based on unlabeled candidate transaction data in accordance with one or more embodiments. These results are after further refinements to the ranking algorithm that are primarily focused on establishing the quality of unlabeled candidate descriptions and grouping similar-quality descriptions into "bands". The data label server 150 can use two metrics to characterize the quality of each description of the unlabeled candidate transaction data: the number of tokens in Bag of Words representations after cleaning and tokenization and the number of instances the Bag of Words representations occur in. Based on these two metrics, each Bag of Words representation is assigned to a band that provides a simple but useful characterization of overall data quality. For example, the first band, such as band 1, includes 1,086,947 transactions which can be converted to 74,350 Bag of Words representations for more than 5 tokens in more than 2 instances. As another example, the eighth band, such as band 8, includes 868,863 transactions which can be converted to 15,794 Bag of Words representations for 2 tokens in 1 instance. Usually, band 1 exhibits the highest data quality and is closest to the original ~3500 description predetermined criteria referenced in FIGS. 4C and 4D. The data quality generally drops as the band number increases. Band 11 is a special category for Bag of Words representations with pre-identified characteristics that are likely to be problematic, such as a negative total spend or certain keywords such as "professional services", etc. These are manually dropped to the lowest prioritization. Based on the defined bands, the data label server 150 can rank the Bag of Words representations within each band using a simple metric such as the number of occurrences or the associated spend. The data label server 150 can take a sample of the top 3000 Bag of Words representations from each band and calculate the similarities for these top candidates against the full unlabeled dataset. The data label server 150 compares the ranked results against a random baseline, such as 100 randomly selected descriptions within each band. In particular, a subset of the top candidates can be manually labeled and assessed for the accuracy of predicted subcategory labels across bands. If two bands have similar accuracy curves, their accuracy curves can be combined into one and ranked together. FIG. 6A, FIG. 6B, FIG. 6C, and FIG. 6D show the accuracy curves for band 1, 2, 4, and 5, respectively. An example of definition of the bands may be found in Table 6 below:

TABLE 6

An example of the definition of the bands.

| Band | Number of Tokens | Number of Instances | Number of Bags-of-Words | Number of Transactions |
|---|---|---|---|---|
| 1 | 5+ | 2+ | 74,350 | 1,086,947 |
| 2 | 5+ | 1 | 1,396,110 | 4,891,240 |
| 3 | 4 | 2+ | 10,149 | 228,955 |
| 4 | 4 | 1 | 386,803 | 1,764,374 |
| 5 | 3 | 2+ | 16,392 | 402,138 |
| 6 | 3 | 1 | 375,432 | 1,618,112 |
| 7 | 2 | 2+ | 27,163 | 693,792 |
| 8 | 2 | 1 | 223,072 | 974,232 |
| 9 | 1 | 2+ | 15,794 | 868,863 |
| 10 | 1 | 1 | 18,090 | 96,972 |
| 11 | Variable | Variable | 44,108 | 218,940 |

In a similar manner to the process described earlier with the results from FIGS. 4C and 4D, the results from FIGS. 6A, 6B, 6C, and 6D can be used to generate band-specific distance thresholds for high-confidence predictions. These band-specific thresholds reflect the variability in description quality and specificity across bands. An example of band-specific thresholds derived from may be found in Table 7 below:

TABLE 7

An example of band-specific Jaccard
distance thresholds for KNN predictions.

| Band | High Confidence Jaccard Distance Cutoff (80% or Higher Label Alignment) |
| --- | --- |
| 1 | 0.7 |
| 2 | 0.35 |
| 3 | 0.7 |
| 4 | 0.35 |
| 5 | 0.4 |
| 6 | 0 (Exact Matches Only) |
| 7 | 0.35 |
| 8 or higher | NA |

Finally, Table 8 below shows an example of the final output of the ranking algorithm. The first record indicates that the unlabeled candidate description "Hammermill Printer Paper, 20 lb Copy Paper" is the highest-similarity match (and that the Jaccard similarity in question is greater than the high-confidence similarity threshold) for 42,600 of the descriptions in the full pool of unlabeled descriptions. Furthermore, manually labeling the subcategory of this candidate unlabeled description will result in 42,600 new high-confidence subcategory predictions when a Jaccard-similarity-based KNN model with K=1 and high-similarity thresholding is used to make predictions on the full pool of unlabeled descriptions. This is the greatest number of new high-confidence predictions that can be produced by this model after labeling one more of the available candidates, providing a strong justification for the top ranking the description receives from the ranking algorithm and the choice of this ranking metric for labeling prioritization. Other values of K can be selected as well to improve model performance while weakening the validity of the ranking metric as an estimate of the marginal benefit of labeling a candidate. However, it seems feasible to accommodate KNN models with K>1 by incorporating the number of high-similarity matches already available for each unlabeled transaction into the ranking metric calculation in an appropriate manner. This extension of the ranking metric may be even more generalizable from the dichotomy of high-confidence/low-confidence to the broader context of continuous class probabilities.

TABLE 8

Example output of ranking algorithm.

| Description | Rank | Ranking Metric (Number of Highest-Similarity High-Confidence Candidate-Unlabeled Pairs) |
| --- | --- | --- |
| Hammermill Printer Paper, 20 lb Copy Paper | 1 | 42,600 |
| HP 414X Black High Yield Toner Cartridge | 2 | 35,299 |
| Duracell Coppertop AA Alkaline Battery, Pack | 3 | 29,982 |
| Staples Sticky Notes, 3" 3", Sheets Pad, Pads Pack | 4 | 24,292 |
| Logitech MK540 Advanced Wireless Keyboard and Mouse Combo, Black | 5 | 21,015 |

5. Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
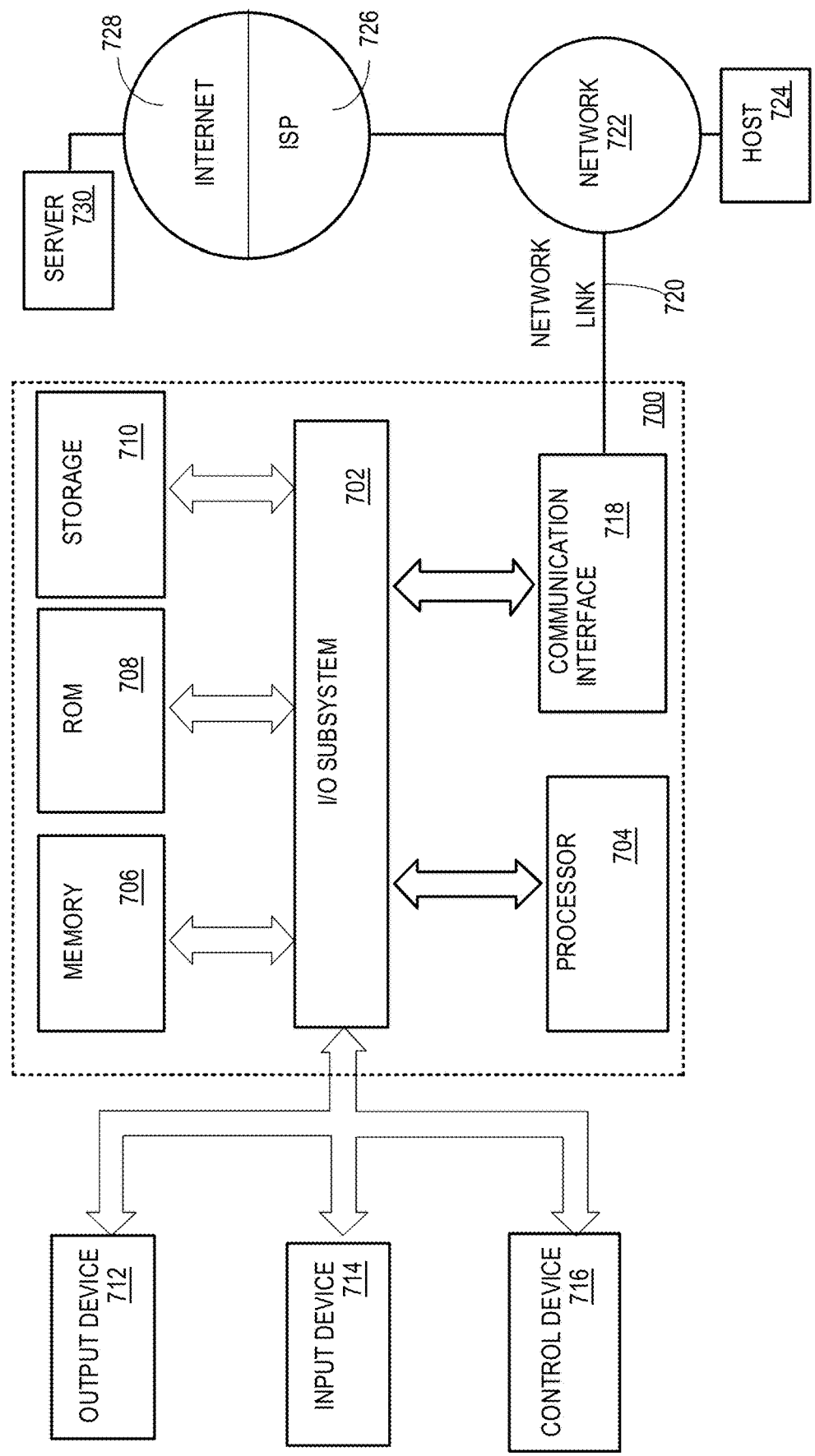
FIG. 7 shows a computer system in accordance with one or more embodiments.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IOT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706.

Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724. Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   one or more processors; and
   one or more memories communicatively coupled to the one or more processors and storing instructions which, when processed by one or more processors of a first computer comprising an automatic data labeling server that is separate from a second computer, cause the one or more processors to execute real-time automatic data labeling by:
   receiving, and storing in a database responsive to structured query language (SQL), unlabeled transaction data, which comprises a plurality of line-level text descriptions;
   extracting the line-level text descriptions from the unlabeled transaction data to determine clean unlabeled descriptions and tokenizing the extracted clean unlabeled descriptions;
   selecting from the unlabeled transaction data, using a first heuristic-based ranking algorithm applying a plurality of criteria comprising attributes and values to identify and remove one or more uninformative tokens from the clean unlabeled descriptions, yielding unlabeled candidate transaction data which is a subset of the unlabeled transaction data and having informative descriptions;
   determining, using a Bag of Words model, a first plurality of features for the unlabeled transaction data and a second plurality of features for the unlabeled candidate transaction data;
   ranking the clean unlabeled descriptions in a plurality of bands based on band-specific metrics associated with a quality of description;
   selecting and pooling top descriptions of each of the bands of the clean unlabeled descriptions and pooling to form pooled descriptions;
   determining from the pooled descriptions a plurality of matching pairs with one description from the clean unlabeled descriptions and one description from the clean unlabeled candidate descriptions;
   calculating a plurality of similarity scores for the plurality of matching pairs using the first plurality of features and the second plurality of features;
   determining a plurality of ranking values for the clean unlabeled candidate descriptions and ranking the clean unlabeled candidate descriptions by a number of best-match clean unlabeled candidate descriptions with a highest similarity score above a high-similarity threshold;
   based on the clean unlabeled candidate descriptions and best-match clean unlabeled candidate descriptions after the ranking, creating and storing a machine learning model that is trained to predict a subcategory label and a ranking value associated with the unlabeled candidate transaction data using the similarity scores and a predetermined high-confidence threshold for the plurality of matching pairs; and
   executing the machine learning model in an inference stage to output a prediction of the subcategory label and the ranking value associated with the unlabeled candidate transaction data.

2. The computer system of claim 1, further comprising additional instructions which, when processed by the one or more processors of the first computer, cause:
   determining an uncertainty value associated with the subcategory label for the unlabeled candidate transaction data.

3. The computer system of claim 2,
   wherein the uncertainty value associated with the subcategory label is determined by a lowest predicted probability of the subcategory label,
   wherein the uncertainty value associated with the subcategory label is determined by maximum entropy of the subcategory label,
   wherein the uncertainty value associated with the subcategory label is determined by maximum disagreement of predicted subcategory label across the unlabeled candidate transaction data, and
   wherein the uncertainty value associated with the subcategory label is determined by maximum number of prediction changes of the subcategory label during machine model training.

4. The computer system of claim 1, further comprising additional instructions which, when processed by the one or more processors of the first computer, cause:
   performing extensive regex-based item description cleaning to remove common tokens that have no bearing on a plurality of target items for the candidate transaction data and the unlabeled candidate transaction data.

5. The computer system of claim 1, wherein the similarity score is determined using a Jaccard similarity based on locality-sensitive hashing.

6. The computer system of claim 1, determining the number of best-match clean unlabeled candidate descriptions using a k-Nearest Neighbor algorithm.

7. The computer system of claim 1, wherein each of the plurality of matching pairs includes a description from the unlabeled transaction data and a description from the unlabeled candidate transaction data.

8. One or more non-transitory computer-readable media storing instructions which, when processed by one or more processors of a first computer comprising an automatic data labeling server that is separate from a second computer, cause the one or more processors to execute real-time automatic data labeling by:
   receiving, and storing in a database responsive to structured query language (SQL), unlabeled transaction data, which comprises a plurality of line-level text descriptions;

extracting the line-level text descriptions from the unlabeled transaction data to determine clean unlabeled descriptions and tokenizing the extracted clean unlabeled descriptions;

selecting from the unlabeled transaction data, using a first heuristic-based ranking algorithm applying a plurality of criteria comprising attributes and values to identify and remove one or more uninformative tokens from the clean unlabeled descriptions, yielding unlabeled candidate transaction data which is a subset of the unlabeled transaction data and having informative descriptions;

determining, using a Bag of Words model, a first plurality of features for the unlabeled transaction data and a second plurality of features for the unlabeled candidate transaction data;

ranking the clean unlabeled descriptions in a plurality of bands based on band-specific metrics associated with a quality of description;

selecting and pooling top descriptions of each of the bands of the clean unlabeled descriptions and pooling to form pooled descriptions;

determining from the pooled descriptions a plurality of matching pairs with one description from the clean unlabeled descriptions and one description from the clean unlabeled candidate descriptions;

calculating a plurality of similarity scores for the plurality of matching pairs using the first plurality of features and the second plurality of features;

determining a plurality of ranking values for the clean unlabeled candidate descriptions and ranking the clean unlabeled candidate descriptions by a number of best-match clean unlabeled candidate descriptions with a highest similarity score above a high-similarity threshold;

based on the clean unlabeled candidate descriptions and best-match clean unlabeled candidate descriptions after the ranking, generating a machine learning model to predict a subcategory label and a ranking value associated with the unlabeled candidate transaction data using the similarity scores and a predetermined high-confidence threshold for the plurality of matching pairs; and determining, using the machine learning model in an inference stage, the subcategory label and the ranking value associated with the unlabeled candidate transaction data.

9. The one or more non-transitory computer-readable media of claim 8, further comprising sequences of instructions which, when executed using the one or more processors, cause the one or more processors to execute determining the similarity score is determined using a Jaccard similarity based on locality-sensitive hashing.

10. The one or more non-transitory computer-readable media of claim 8, further comprising sequences of instructions which, when executed using the one or more processors, cause the one or more processors to execute determining the number of best-match clean unlabeled candidate descriptions using a k-Nearest Neighbor algorithm.

11. The one or more non-transitory computer-readable media of claim 8, further comprising sequences of instructions which, when executed using the one or more processors, cause the one or more processors to execute converting each of the informative descriptions into a Bag of Words representation based on the Bag of Words model by executing a Latent Dirichlet Allocation algorithm.

12. The one or more non-transitory computer-readable media of claim 8, further comprising sequences of instructions which, when executed using the one or more processors, cause the one or more processors to execute:

ranking the clean unlabeled descriptions in a plurality of L bands based on band-specific metrics associated with a quality of description, where L=2 to 11;

selecting and pooling top N descriptions of each of the L bands of the clean unlabeled descriptions and pooling to form L*N descriptions.

13. The one or more non-transitory computer-readable media of claim 8, wherein the database comprises the clean unlabeled descriptions in a first quantity M of 10 million descriptions, and the clean unlabeled candidate descriptions comprise N descriptions in a second quantity of 20,000 descriptions; wherein executing the determining the plurality of matching pairs reduces total matching pairs from M*M to M*N.

* * * * *